US012748770B2

(12) United States Patent
Hebbar et al.

(10) Patent No.: US 12,748,770 B2
(45) Date of Patent: Sep. 29, 2026

(54) GENERATING A DATABASE SYSTEM USING DISTRIBUTED DATA SOURCES TO FACILITATE DATA RETRIEVAL

(71) Applicant: Truist Bank, Charlotte, NC (US)

(72) Inventors: Nagaraja Hebbar, Atlanta, GA (US); Sweta Sharan, Atlanta, GA (US); Alka Nagar, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/932,986

(22) Filed: Oct. 31, 2024

(65) Prior Publication Data

US 2026/0119522 A1 Apr. 30, 2026

(51) Int. Cl.
*G06F 16/25* (2019.01)
*G06F 16/2455* (2019.01)

(52) U.S. Cl.
CPC ...... *G06F 16/258* (2019.01); *G06F 16/24552* (2019.01)

(58) Field of Classification Search
CPC .......................... G06F 16/258; G06F 16/24552
See application file for complete search history.

(56) References Cited

U.S. PATENT DOCUMENTS

| | | | | |
|---|---|---|---|---|
| 12,367,146 | B1 * | 7/2025 | Boles | G06F 12/0831 |
| 2005/0246353 | A1 * | 11/2005 | Ezer | G06F 40/186 |
| 2010/0198716 | A1 * | 8/2010 | Chatzky | G06Q 40/06 705/37 |
| 2023/0075217 | A1 * | 3/2023 | Rosanwo | G06Q 40/08 |
| 2024/0205241 | A1 * | 6/2024 | Chung | H04L 63/1425 |
| 2025/0245259 | A1 * | 7/2025 | Saidon | G06F 16/353 |

* cited by examiner

*Primary Examiner* — Cheyne D Ly
(74) *Attorney, Agent, or Firm* — Kilpatrick Townsend & Stockton LLP; Michael A. Springs, Esq.

(57) ABSTRACT

A database system can be generated using distributed data sources to facilitate data retrieval. For example, a processing device can receive one or more messages from one or more data sources. Each data source can provide the messages in a non-standardized format. The processing device can convert the messages from the data sources into a standardized format. The processing device can store the converted messages in the standardized format as a dataset in the database system. The processing device can provide access by one or more subscribers to the database system to collect at least a portion of the dataset. The processing device can output, based on a request from at least one of the subscribers, an interface that includes at least the portion of the dataset to a user.

14 Claims, 5 Drawing Sheets

GENERATING A DATABASE SYSTEM USING DISTRIBUTED DATA SOURCES TO FACILITATE DATA RETRIEVAL

TECHNICAL FIELD

The present disclosure relates generally to databases and electronic interaction systems and, more particularly (although not necessarily exclusively), generating a database system using distributed data sources to facilitate data retrieval.

BACKGROUND

An electronic transfer operation may be generated based on a transfer request initiated by an originating entity to an originating entity. Subsequently, the transfer request may be processed by the originating entity to perform the electronic transfer operation. Server operators can process millions of electronic transfer operations daily for a variety of entities. A server operator can receive a request to provide information associated with a portion of the electronic transfer operations. The request can originate from a variety of locations or entities and can occur at any time during a day. Retrieving and transmitting information related to the portion of the electronic transfer operations can be time-consuming or inefficient with respect to storage resources.

SUMMARY

In one example, a system includes a processing device and a memory that includes instructions executable by the processing device for causing the processing device to perform operations. The operations include receiving one or more messages from one or more data sources, where each data source of the one or more data sources provides the messages in a non-standardized format. The operations include converting the one or more messages from the one or more data sources into a standardized format. The operations include storing the converted one or more messages in the standardized format as a dataset in a database system. The operations include providing access by one or more subscribers to the database system to collect at least a portion of the dataset. The operations include outputting, based on a request from at least one of the one or more subscribers, an interface that comprises at least the portion of the dataset to a user.

In another example, a computer-implemented method can be performed. The computer-implemented method includes receiving, by a processing device, one or more messages from one or more data sources, where each data source of the one or more data sources provides the messages in a non-standardized format. The computer-implemented method includes converting, by the processing device, the one or more messages from the one or more data sources into a standardized format. The computer-implemented method includes storing, by the processing device, the converted one or more messages in the standardized format as a dataset in a database system. The computer-implemented method includes providing, by the processing device, access by one or more subscribers to the database system to collect at least a portion of the dataset. The computer-implemented method includes outputting, by the processing device based on a request from at least one of the one or more subscribers, an interface that comprises at least the portion of the dataset to a user.

In yet another example, a non-transitory computer-readable medium can include program code executable by a processing device for causing the processing device to perform one or more operations. The operations include receiving one or more messages from one or more data sources, where each data source of the one or more data sources provides the messages in a non-standardized format. The operations include converting the one or more messages from the one or more data sources into a standardized format. The operations include storing the converted one or more messages in the standardized format as a dataset in a database system. The operations include providing access by one or more subscribers to the database system to collect at least a portion of the dataset. The operations include outputting, based on a request from at least one of the one or more subscribers, an interface that comprises at least the portion of the dataset to a user.

DETAILED DESCRIPTION

Figure 1:
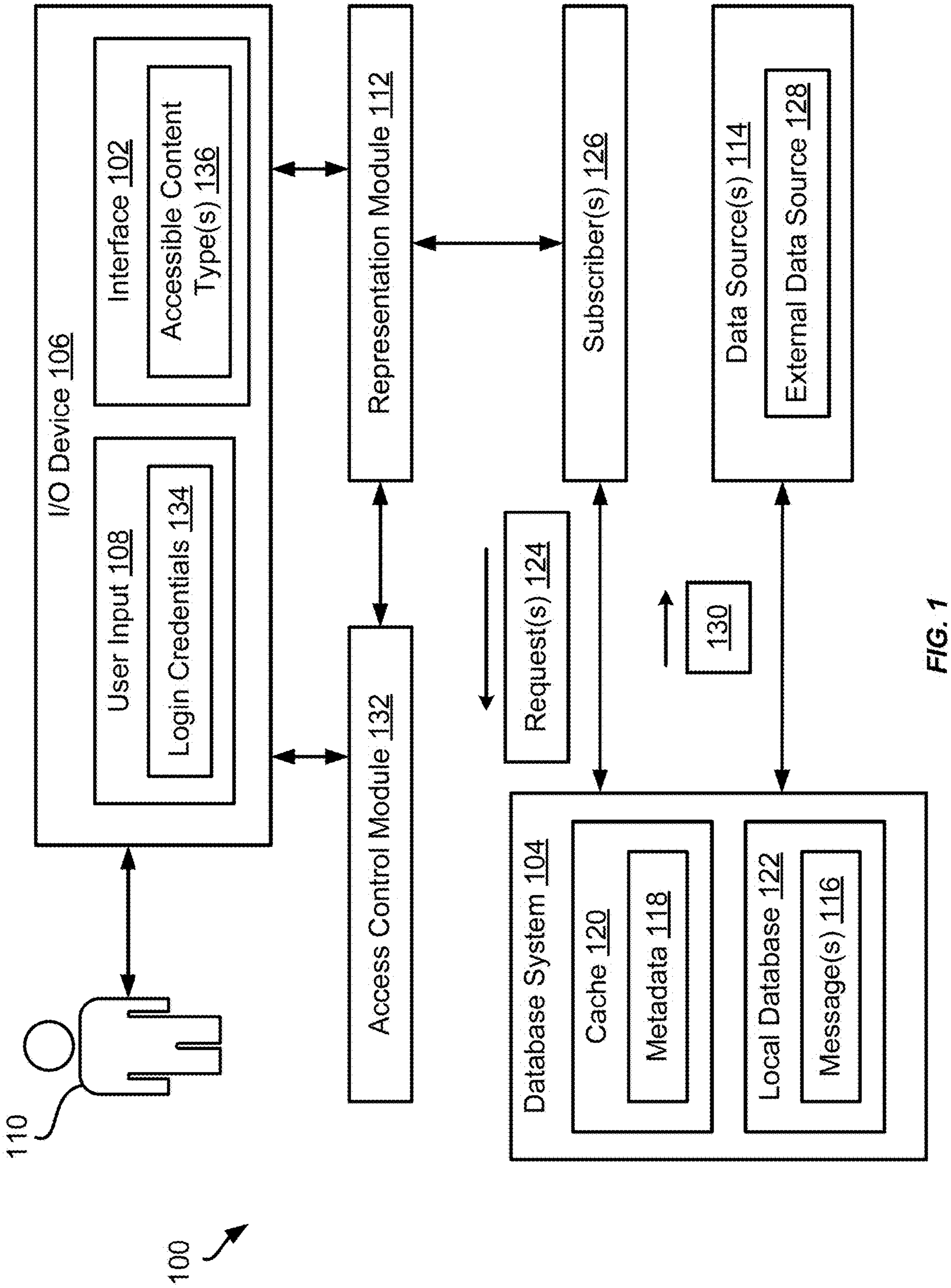
FIG. 1 is a block diagram of an example of a computing environment to generate a database system using distributed data sources to facilitate data retrieval according to some aspects of the present disclosure.

Certain aspects and examples of the present disclosure relate to generating a database system using distributed data sources to facilitate data retrieval. Each data source can transmit one or more messages to provide data in different formats, such as non-standardized formats. In an example, outputting a user interface can involve data retrieval to provide an overview or aggregation of the information provided by the data sources. Streamlining data retrieval of information provided by the distributed data sources can involve converting the messages from the data sources into a standardized format. Once converted into the standardized format, the messages can be stored as a dataset in a database system. One or more subscribers can access the database system to retrieve suitable information, such as to include in the interface. In some implementations, retrieving the suitable information can involve searching or querying the database system. For instance, each subscriber can collect information related to a particular type of transfer operation from the database system. Based on a request from at least one subscriber, the interface can be outputted to present to a user at least a portion of the dataset stored in the database system.

Data retrieval from multiple, heterogeneous data sources can be time-consuming or difficult to complete within an expected response time. In an example, generating an interface that includes information from multiple data source can be inefficient and time-consuming due to a system making one or more calls to multiple data sources to retrieve the information to be outputted via the interface. For instance, the necessary information may aggregate data from multiple applications and databases that may have different response times or may use different communication protocols, thereby complicating communication used to obtain the data. Slow response times of certain data sources can contribute to inefficiencies or delays in retrieving the necessary information. Additionally, certain data sources may be associated with a third-party entity or an external entity that may limit data transfer, such as with respect to frequency or an amount of data provided. To further complicate data retrieval, the data sources may be hosted in different types of computing environments, such as in a cloud environment or on-premises.

Some examples described herein can address one or more of the abovementioned problems using a database system generated using distributed data sources. In an example, the database system can include a cache and a local database to store information related to transfer operations. The information can be provided via one or more messages transmitted by the distributed data sources. In an example, a portion of the information included in the messages may be stored separately from the remaining information provided in the messages. In particular, metadata related to the transfer operations can be stored in the cache that can execute read operations or write operations faster than the local database, resulting in faster response times with respect to accessing data stored in the cache. In an example, the information stored in the database system can be transformed from one or more non-standardized formats into a standardized format. For instance, each data source may have a respective data format used to generate messages including the information related to transfer operations. The standardized format can facilitate data processing efficiency and management to reduce time needed to respond to data retrieval requests, such as to generate an interface.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 to generate a database system 104 using distributed data sources to facilitate data retrieval according to some aspects of the present disclosure. In some examples, components within the computing environment 100 may be part of a single computing device, such as a laptop computer, a server, or a mobile device. In other examples, the components within the computing environment 100 can be positioned in separate locations or separate devices that are communicatively coupled, such as via a network (e.g., the Internet).

As depicted in FIG. 1, the computing environment 100 can include an input/output (I/O) device 106 that can receive user input 108 from a user 110, such as including instructions to retrieve data from one or more data sources 114. As an example, the user 110 may provide the user input 108 to generate an interface 102. In some implementations, the user 110 may interact with the I/O device 106 such that the interface 102 outputted via the I/O device 106 provides a representation of a dataset or a portion of the dataset. The I/O device 106 can be communicatively coupled to a representation module 112 that can be executed to generate the interface 102. In some examples, the I/O device 106 may communicate with the representation module 112 based on the user input 108 to generate the interface 102 such that the interface 102 includes content or data requested by the user 110. In particular, the interface 102 can present an aggregation of data provided by the data sources 114. In other words, the interface 102 can visualize different types of data organized in different ways from a variety of data sources 114. The data sources 114 can include data related to transfer operations, events, interactions, etc. For example, if a particular data source is a software application, the software application can store information submitted by one or more entities while using the software application. The database system 104 can store a dataset including data provided by the data sources 114. To obtain suitable information to include in the interface 102, the representation module 112 can request and receive at least a portion of a dataset stored in the database system 104.

In some implementations, a subset of the data sources can be hosted by third-party or external entities, such as in a cloud environment or in an on-premises system. Additionally or alternatively, the data sources may use different formats to provide the data included in the dataset. Examples of the formats can include messaging queues, logs, caches, etc. Accordingly, transmitting individual requests to each data source to collect the dataset used to generate the interface 102 can be time-consuming and inefficient, such as with respect to system resources. For example, each data source may take different amounts of time to generate a response to the requests. Additional time may be spent to process the responses received from the data sources 114 before the interface 102 can be generated.

To facilitate data retrieval from the data sources 114, the computing environment 100 can generate the database system 104 that can store the dataset or at least a portion of the dataset including data provided by the data sources 114. In an example, the database system 104 can facilitate data retrieval involved in the creation of the interface 102. In some examples, the database system 104 can be built using data provided by the data sources 114. In particular, the database system 104 can store one or more messages 116 sent by the data sources 114. The messages 116 can be communication data provided by the data sources 114. Data types of the communication data provided in the messages 116 can include strings of characters, text, sensor data, or other suitable digital content. Data entries stored in the database system 104 can be tagged with a data identifier that can indicate an identity (e.g., data type) of data stored in the database system 104. In some examples, the messages 116 can relate to transfer operations or interaction events between entities, such as a source entity transferring a set of system resources to a target entity. In particular, the messages 116 can include metadata 118 or other information related to transfer operations, events, interactions, etc. In an example, the metadata 118 of the messages 116 can indicate a number of incomplete transfer operations, a number of completed transfer operations, a number of suspended transfer operations, or a combination thereof. By aggregating data used to generate the interface 102, the database system 104 can decrease a response time needed to perform data retrieval. In an example, due to most, if not all, of the data to generate the interface 102 being accessible in the database system 104, the interface 102 can be generated in less time compared to making individual calls to the data sources to obtain the data.

In an example, the database system 104 can store the metadata 118 separate from the messages 116. As shown in FIG. 1, the database system 104 can include a cache 120 storing the metadata 118 and a local database 122 storing the messages 116. The cache 120 can be a hardware component or a software component of the database system 104 that can provide data faster than the local database 122. For example, the cache 120 can have a lower storage capacity compared to the local database 122 to enable faster response times, such as by minimizing propagation delays. The metadata 118 can consume less storage resources compared to storing an entirety of the messages 116. To leverage the faster response times of the cache 120, the metadata 118 can be stored in the cache 120 rather than the entirety of the messages 116.

In an example, contents of the cache 120, the local database 122, or a combination thereof can include data from an earlier computation or data that has already undergone processing. For example, the cache 120 can include the metadata 118 in a standardized format after the messages 116 are converted from non-standardized formats into the standardized format. The messages 116 stored in the local database 122 can be converted messages 116 stored in the standardized format. Accordingly, future requests transmitted to the cache 120 or the local database 122 can be responded to using the metadata 118 or the messages 116 that are already in the standardized format. Additional details related to converting the messages 116 to the standardized format are described with respect to FIG. 2 below.

In some examples, the local database 122 can be hosted in a local drive or on a local area network. In particular, a database application related to the local database 122 can be hosted on the same computing system as the local database, which can enable faster response times compared to remote databases. The database application can be a computer program or software that can enable the user 110 or another suitable entity to access, store, or manage data with respect to the local database 122. In some examples, the local database 122 can function as a backing store of the cache 120. In other examples, a different storage component (e.g., a repository or a different database) in the database system 104 may be the backing store of the cache 120. The backing store can store a copy of each data entry stored in the cache 120, such as to provide redundancy in case of the cache 120 crashing. In an example, if the cache 120 crashes, the cache 120 may lose one or more data entries that were previously stored in the cache 120. By providing redundancy, the backing store can enable the cache 120 to recover its data entries using the copies of the data entries that are stored in the backing store. For example, by storing the entirety of the messages 116 including the metadata 118, the local database 122 can be used to rebuild (e.g., repopulate the cache 120 with the metadata 118) if the cache 120 crashes or otherwise malfunctions.

In some examples, the database system 104 can provide its contents to generate the interface 102, such as based on at least one request 124 generated by one or more subscribers 126 in communication with the database system 104. The subscribers 126 can be communicatively coupled to the representation module 112 and the database system 104, such as to facilitate data transfer between the database system 104 and the representation module 112. For example, based on communication from the representation module 112, the subscribers 126 may transmit the request 124 to the database system 104 to collect or obtain suitable data stored in the database system 104. In some examples, the request 124 outputted by the subscribers 126 can indicate requested information used to generate the interface 102. For example, the requested information can be defined based on the user input 108 provided by the user 110 that can include instructions related to generating the interface 102.

In some implementations, retrieving the requested information can involve querying, searching, or otherwise checking the cache 120 to determine whether the cache 120 includes at least a portion of the requested information. For instance, searching the cache 120 can involve determining a specific data identifier of the requested information and checking each data identifier of each data entry stored in the cache 120 to determine whether a match exists. In some examples in which the specific data identifier is the same as a data identifier associated with the cache 120, a cache hit can occur where the requested information is present in the cache 120. Based on the requested information being present in the cache 120, the cache 120 can provide the requested information to the subscriber(s) 126 that generated the request 124. Accordingly, the metadata 118 stored in the cache 120 may be sufficient to resolve the request 124. Once the subscriber(s) 126 receive the requested information, the subscriber(s) 126 can transmit the requested information to the representation module 112 to generate the interface 102.

Conversely, in an example in which a cache miss occurs, the requested information may be missing or otherwise unavailable in the cache 120. Contents of the backing store (e.g., the local database 122) then may be accessed to determine whether the requested information is stored in the backing store. If the requested information is found in the backing store, a copy of the requested information can be stored in the cache 120 to respond to future requests. In some examples, a caching algorithm or heuristic can be applied to update the cache 120 to store the copy of the requested information. For example, a new data entry including the copy of the requested information can replace a least recently accessed data entry currently stored in the cache 120.

In an example, the database system 104 may lack at least a portion of the requested information indicated in the request 124 received from the subscribers 126. For example, contents of the database system 104 (e.g., the cache 120 and the local database 122) can be searched and determined to lack a match with the requested information. As another example, the database system 104 may include a portion of the requested information but lack a remaining portion of the requested information. Accordingly, the contents of the database system 104 may be insufficient to resolve the request 124, such as with respect to retrieving sufficient information from the database system 104. Based on the contents of the database system 104 being insufficient to resolve the request 124, an external data source 128 can be used to resolve the request 124. In an example, the external data source 128 can be a data source external to or separate from the database system 104. The database system 104 or the subscribers 126 may communicate with the external data source 128 to determine whether the external data source 128 includes sufficient information (e.g., the remaining portion of the requested information) to resolve the request 124.

In an example in which the external data source 128 can resolve the request 124, the database system 104 or the subscribers 126 may transmit a retrieval request 130 to the external data source 128 to collect suitable data from the external data source 128. For instance, the retrieval request 130 can indicate the remaining portion of the requested information such that the external data source 128 can include the remaining portion of the requested information in its response to the retrieval request 130. The external data source 128 can transmit the response to the retrieval request 130 to an originator of the retrieval request 130, such as the database system 104 or the subscribers 126. In some examples, upon receiving the remaining portion of the requested information, the database system 104 can be updated to include the remaining portion of the requested information, such as to facilitate further requests from the subscribers 126. Although the external data source 128 is described herein as being one data source, it will be appreciated that the remaining portion of the requested information may be stored as separate datasets in more than one external data source.

Once the remaining portion of the requested information is obtained, the requested information can be provided to the representation module 112 to generate the interface 102. As an example, once the subscribers 126 receive the requested information from the database system 104 or the external data source 128, the subscribers 126 can transmit the requested information to the representation module 112. In some examples, each subscriber 126 may be associated with a respective topic or communication channel that relates to a particular content type. Examples of the content types can include types of the transfer operations, status of the transfer operations, amounts of resources involved in the transfer operations, etc. Each subscriber 126 can be registered to listen to or collect data of the particular content type associated with its corresponding communication channel. The database system 104 can publish to each communication channel a respective subset of the contents of the database system 104 that relates to the particular content type of each communication channel. For example, the database system 104 may generate a publish event to provide updated data to the subscribers 126 after the database system 104 is updated (e.g., to include new data in or remove outdated data from the database system 104). Once a particular subset is made available to a corresponding communication channel by the database system 104, each subscriber 126 associated with the corresponding communication channel can receive the particular subset.

As described herein, the representation module 112 can indicate to the subscribers 126 (e.g., using a request or message) to collect at least a portion of the dataset stored in the database system 104 to obtain suitable data to output via the interface 102. In some examples, the representation module 112 may communicate with individual subscribers based on the particular content type of the communication channel(s) to which the individual subscribers are registered. For example, based on the user input 108, the representation module 112 may determine that the requested information relates to a first content type and a second content type. The representation module 112 then can communicate with suitable subscribers that can provide data corresponding to the first and second content types based on the communication channels to which the suitable subscribers are registered. In some examples, the representation module 112 can include an application programming interface (API) to facilitate communication with the subscribers 126 or other components in the computing environment 100. For example, the API may enable the representation module 112 to communicate with separate subscribers. Additionally or alternatively, the representation module 112 can use the API to provide the interface 102 to the I/O device 106.

In some implementations, once the representation module 112 receives the requested information, the representation module 112 may generate one or more representations of the requested information. For example, the representations can include an aggregated representation of the requested information, such as charts, plots, graphs, etc. In an example, the representation module 112 may group the representations based on a respective content type of the requested information used to generate the representations. For instance, the representation module 112 can determine that a subset of the requested information corresponds to completed transfer operations, while a remainder of the requested information corresponds to pending transfer operations. The representation module 112 then can generate a first group of representations using the subset of the requested information and a second group of representations using the remainder of the requested information. As another example, the representation module 112 may generate one or more groups of the representations where each group of the representations presents a subset of the requested information that corresponds to a respective originator of transfer operations.

In some examples, the user 110 may be associated with certain access permissions that can control or restrict access by the user 110 to at least one content type of the dataset stored in the database system 104. For example, the user 110 can be assigned to a particular access group such that the user 110 is prevented from accessing data related to certain entities. The computing environment 100 can include an access control module 132 to determine the access permissions of the user 110, such as based on login credentials 134 related to the user 110. The login credentials 134 can include a user identifier corresponding to the user 110 and an authentication factor (e.g., a password). In some examples, the user 110 may provide the login credentials 134 as part of the user input 108 to the I/O device 106. As an example, the computing environment 100 may implement single sign-on such that the user 110 can access one or more software systems in the computing environment 100 using a single user identifier.

Based on the login credentials 134, the access control module 132 can determine a set of content types 136 that the user 110 is allowed to access. For example, the login credentials 134 may indicate that the user 110 is part of a particular access group. Access permissions associated with the particular access group can be applied to the user 110 to define the set of content types 136 accessible by the user 110. In an example, the access control module 132 can maintain a repository or other suitable storage system that can include one or more mappings that can link each login credential to a particular access group or a set of access permissions. Once the access permissions of the user 110 are determined, the access control module 132 can communicate with the representation module 112 to ensure that the representations generated by the representation module 112 comply with the access permissions. The access control module 132 can provide the set of accessible content types 136 to the representation module 112 to customize the interface 102 presented to the user 110. For example, the access control module 132 may determine whether the user 110 is restricted from accessing certain content types requested by the user 110 (e.g., in the user input 108) to include in the interface 102. In some implementations, the access control module 132 can compare a set of requested content types indicated in the user input 108 with the set of accessible content types 136 determined based on the login credentials 134 of the user 110. Based on this comparison, the access control module 132 can determine a subset of the requested content types that include one or more restricted content types that the user 110 is not permitted to access. The access control module 132 can communicate with the representation module 112 can generate representations based on the set of accessible content types 136.

Based on the user 110 being restricted from accessing certain content types requested by the user 110, the access control module 132 can communicate with the representation module 112 to prevent the representation module 112 from requesting restricted data, such as to conserve system resources. Additionally or alternatively, the representation module 112 may provide an interface element in the interface 102 to alert or notify the user 110 that the user 110 is unauthorized to access certain content types based on the login credentials 134 provided. For example, the interface element can be an alert that can list the restricted content types that the user 110 is unauthorized to access. In an example, the interface element may prompt the user 110 to provide other authentication factors or different login credentials to access the restricted content types.

In some examples, the user 110 may interact with the interface 102 to generate an updated user interface, such as to include additional information or different information compared to current information presented in an existing user interface. For example, as described above, the user 110 may provide other authentication factors, such as via a text box of the interface 102, to access the restricted content types. As another example, the user input 108 provided by the user 110 can include feedback with respect to the interface 102. The user 110 can interact with the interface 102 using the I/O device 106, such as by providing selections or instructions, clicking certain interface elements, etc. Based on the user input 108, the representation module 112 may generate one or more updated representations, such as to include information related to additional content types, to include in the updated user interface.

Although FIG. 1 depicts a certain number and arrangement of components, this is for illustrative purposes and is intended to be non-limiting. Other examples may include more components, fewer components, different components, or a different arrangement of the components shown in FIG. 1. For example, more than one external data source may be included in the computing environment 100.

Figure 2:
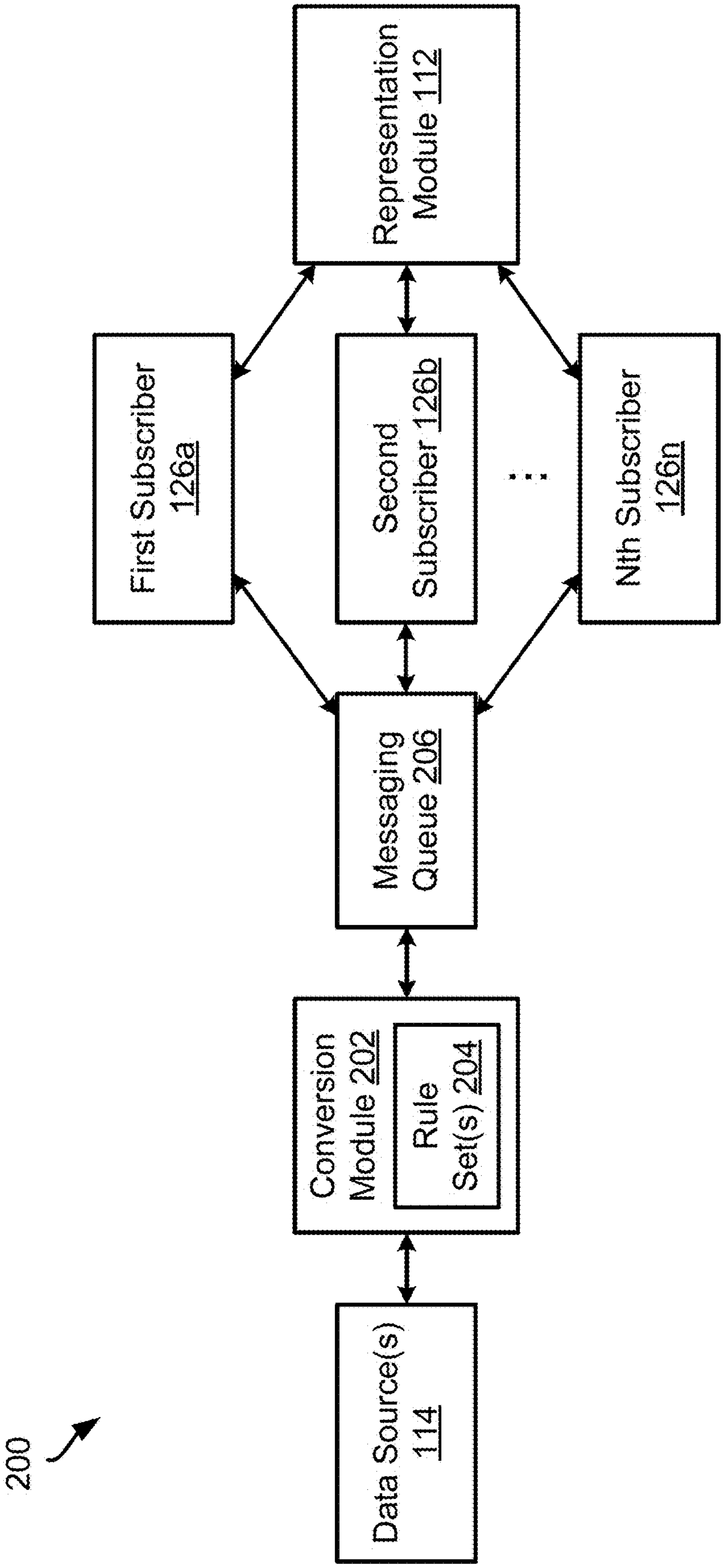
FIG. 2 is a block diagram of an additional example of a computing environment to generate a database system using distributed data sources to facilitate data retrieval according to some aspects of the present disclosure.

FIG. 2 is a block diagram of an additional example of a computing environment 200 to generate a database system using distributed data sources to facilitate data retrieval according to some aspects of the present disclosure. Certain aspects of FIG. 2 are described below with respect to components of FIG. 1. As shown in FIG. 2, the computing environment 200 can include a conversion module 202 that can receive communication (e.g., messages) from one or more data sources 114. Examples of the data sources 114 can include software applications, databases, files, etc. Each data source 114 may provide data in a different format, which can complicate data retrieval and data processing. Examples of the formats can include logs, caches, messaging queues, etc. The conversion module 202 can be executed to convert the communication from the data sources 114 from one or more non-standardized formats into a standardized format that can enable faster retrieval and processing compared to the non-standardized formats. In an example, once the conversion module 202 converts the communication into the standardized format, the conversion module 202 can generate a dataset in the standardized format to store in a database system (e.g., the database system 104 of FIG. 1).

In some examples, the conversion module 202 may apply one or more rule sets 204 to convert the communication into the standardized format. As an example, the conversion module can be a rule engine that can use the rule sets 204 to convert the communication into the standardized format. The rule sets 204 can be generated based on historical events or historical data, heuristics, etc. To determine which rule set to apply, the conversion module 202 may identify a keyword or another suitable identifier included in the communication. In some examples, the conversion module 202 can include one or more mappings that relate a particular identifier to a corresponding rule set. Once the keyword or the particular identifier is detected in the communication, the conversion module 202 can use the mappings to determine the corresponding rule set. As an example, the conversion module 202 can receive a message from a software application that includes a log maintained by the software application. Based on a file extension of the log that indicates a file format or file type of the log, the conversion module 202 can apply a suitable rule set to extract information from the log and generate a converted version of the log that conforms to the standardized format.

In some examples, converting the communication into the standardized format can involve rearranging or otherwise modifying a structure of the communication. As an example, when received by the conversion module 202, the communication may include unstructured data (e.g., text) that may lack predefined organization. By applying the rule sets 204, the conversion module 202 can transform the unstructured data into structured data (e.g., a table) that is compliant with the standardized format. For example, the communication from a particular data source may include a set of characters obtained by performing character recognition to convert an image including text into a machine-readable format. The set of characters provided by the particular data source to the conversion module 202 can be machine-readable but may lack organization or structure related to context or classification of the set of characters. Applying the rule sets 204 can involve identifying certain data fields included in the image, extracting the set of characters from the data fields, and structuring the set of characters into one or more groups or categories (e.g., by date, content type, quantity, etc.). In some examples, the converted communication may include an identifier (e.g., a keyword, tag, etc.) at a predefined and standardized location in the converted communication to facilitate data retrieval based on the identifier.

As described herein, once the communication is converted to the standardized format, the conversion module 202 can transmit the standardized communication to a storage system (e.g., the database system 104 of FIG. 1) for storage and later retrieval. In some examples, the storage system may include or be in communication with a messaging queue 206. The messaging queue 206 can provide access to contents of the storage system by one or more subscribers 126*a-n* (e.g., a first subscriber 126*a*, a second subscriber 126*b*, or up to an nth subscriber 126*n*). Each subscriber 126 can be associated with a specific content type of data provided by the data sources 114. As an example, the first subscriber 126*a* may be registered to receive data related to real-time transfer operations that occur substantially contemporaneously. As another example, the second subscriber 126*b* can be registered to receive data related to scheduled transfer operations generated prior to an expected release date. The messaging queue 206 can selectively publish data to the subscribers 126 such that the subscribers 126 receive data related to the specific content type that the subscribers 126 are registered to receive. Accordingly, the messaging queue 206 can facilitate data retrieval with respect to the storage system.

Additionally, each subscriber 126 can be in communication with a representation module 112. In particular, the subscribers 126 can provide suitable data to the representation module 112 to generate the interface. In some examples, the representation module 112 can determine certain content types requested by a user (e.g., the user 110 of FIG. 1) to include in the interface. The representation module 112 then can selectively communicate with a subset of the subscribers 126 that are registered to receive data related to the requested content types. Once this subset of the subscribers 126 receives the data related to the requested content types, the subscribers 126 can forward the data to the representation module 112 to generate the interface.

Figure 3:
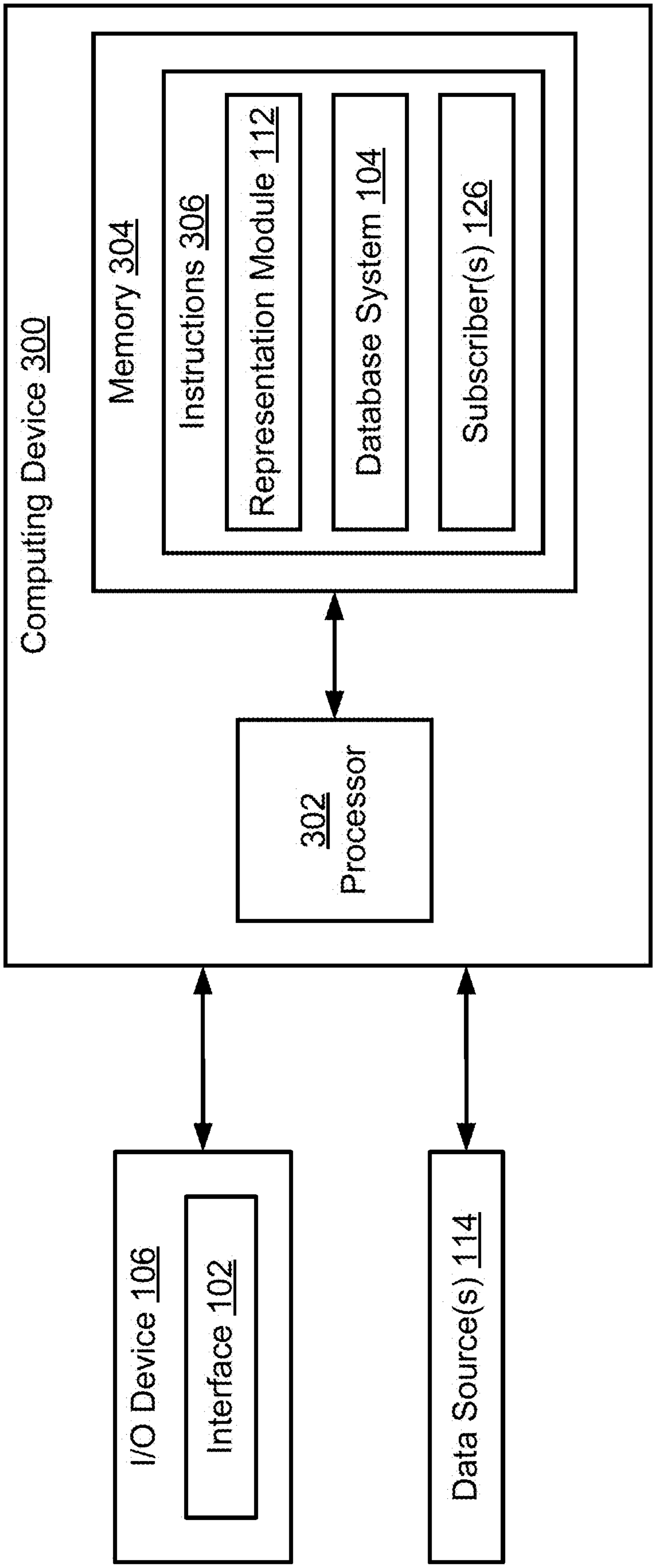
FIG. 3 is a block diagram of a computing device to generate a database system using distributed data sources to facilitate data retrieval according to some aspects of the present disclosure.

FIG. 3 is a block diagram of an example computing device 300 according to some aspects of the present disclosure. The computing device 300 includes a processing device 302 that is communicatively coupled to a memory 304. In some examples, the processing device 302 and the memory 304 may be distributed from (e.g., remote to) one another. FIG. 3 is described below with reference to components of FIG. 1 discussed above.

The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory 304 to perform operations. In some examples, the instructions 306 can include processor-specific instructions generated by a compiler or an interpreter from code written in a suitable computer-programming language, such as C, C++, C#, etc.

The memory 304 can include one memory or multiple memories. In an example, the memory 304 can be a memory device. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory, computer-readable medium from which the processing device 302 can read instructions 306. The non-transitory computer-readable medium can include program code executable by the processing device 302 to perform one or more operations. A computer-readable medium can include electronic, optical, magnetic, or other storage devices capable of providing the processing device 302 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processing device 302 can execute the instructions 306 to generate a database system 104 using distributed data sources to facilitate data retrieval. As an example, the database system 104 can be accessed to retrieve information related to one or more transfer operations or interactions between entities. The processing device 302 then can generate an interface 102 to present this information to a user 110. The processing device 302 can receive one or more messages (e.g., message(s) 116 of FIG. 1) from one or more data sources 114 that can provide the information related to the transfer operations or interactions between the entities. The data sources 114 can provide the messages in a non-standardized format. In an example, the non-standardized format can be a proprietary format such that specification of how the proprietary format is encoded may be unpublished or generally unavailable. The processing device 302 can convert the messages into a standardized format, such as to decrease response delays related to data processing or data retrieval. The processing device 302 can store the converted messages in the standardized format as a dataset in the database system 104. In some examples, the dataset stored in the database system 104 may be split into two or more subsets that can be stored in separate components of the database system 104. The processing device 302 can provide access by one or more subscribers 126 to the database system 104 to collect at least a portion of the dataset stored in the database system 104. For example, the processing device 302 can register the subscribers 126 to one or more communication channels of the database system 104. The subscribers 126 then can receive data from the database system 104 via the communication channels. Additionally, the processing device 302 can output, based on a request 124 from at least one of the subscribers 126, the interface 102 that includes at least the portion of the dataset to a user (e.g., the user 110 of FIG. 1). In some examples, the data provided by the database system 104 to the subscribers 126 can resolve the request 124 of the subscribers 126 and provide suitable information to generate the interface 102.

In some examples, the computing device 300 may be communicatively coupled to one or more input/output (I/O) components, such as an I/O device 106. For example, the computing device 300 can include a touchscreen, a mouse, a keyboard, a trackball, a touch pad, a visual or audio display, or any combination of these. The user can use the I/O device to interact with the interface 102, such as to provide feedback to update or modify the interface 102. In an example, the I/O components can be integrated into a single structure with the components of the computing device 300. For example, the I/O device 106 may be positioned within a single housing with the components of the computing device 300. In other examples, the I/O components can be distributed (e.g., in separate housings) and in electrical communication with each other and the computing device 300. For example, the I/O device 106 may be part of a computing device that is separate from the computing device 300.

Figure 4:
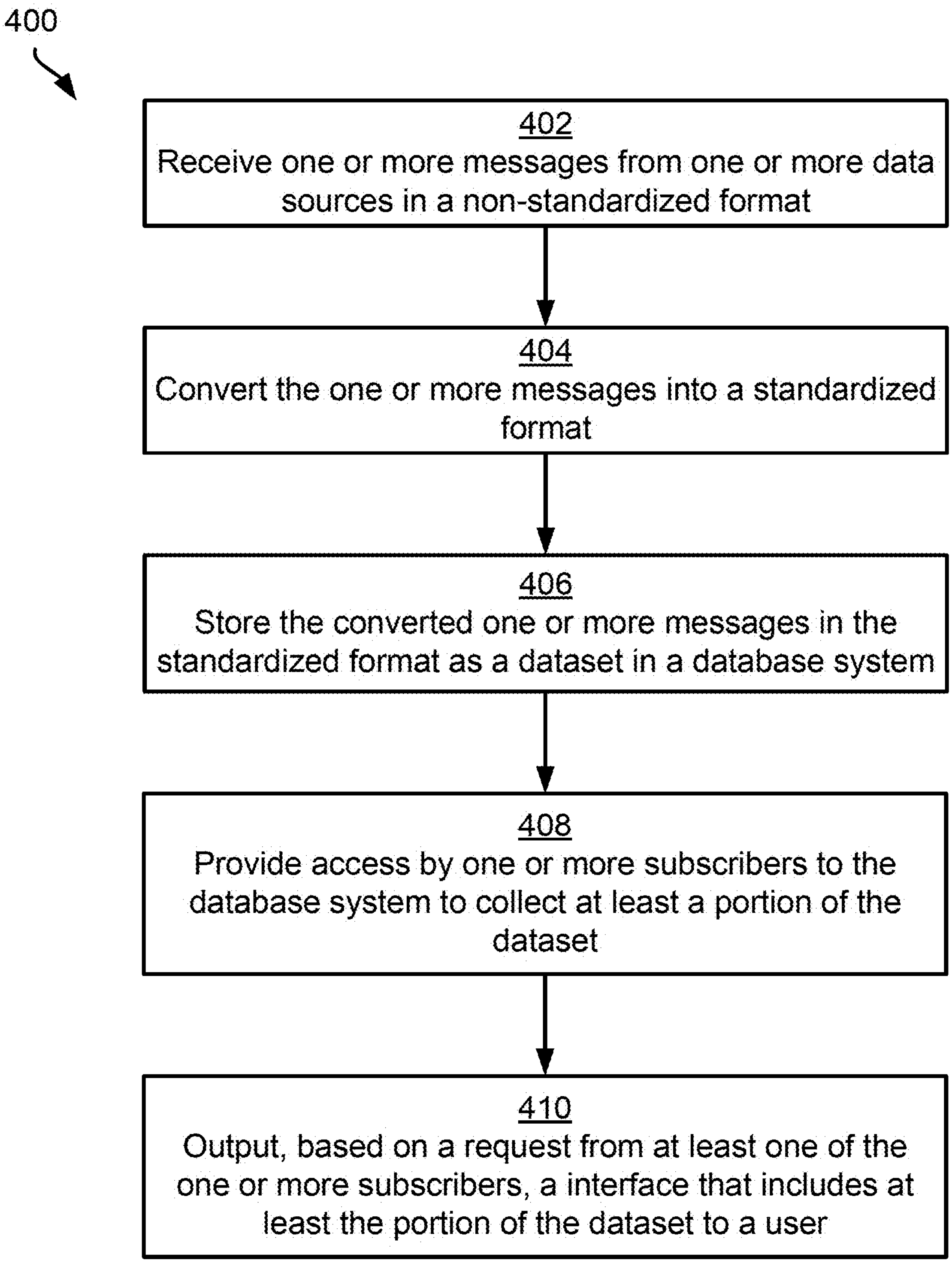
FIG. 4 is a flow chart of an example process of using a database system generated using distributed data sources to generate an interface according to some aspects of the present disclosure.

Turning now to FIG. 4, shown is a flow chart of an example process 400 of using a database system 104 generated using distributed data sources to generate an interface 102 according to some aspects of the present disclosure. Other examples can involve more operations, fewer operations, different operations, or a different order of operations shown in the figures. The operations of FIG. 4 will now be described below with reference to the components described above in FIG. 1 and FIG. 2. Some or all of the steps of the process 400 can be performed by the processing device 302.

At block 402, the process 400 involves receiving one or more messages 116 from one or more data sources 114. Each data source of the data sources 114 can provide the messages 116 in a non-standardized format. In other words, each data source may provide its messages 116 in a different format, such as due to different hardware or software associated with each data source. In some examples, the database system 104 can include one or more application programming interfaces (APIs) or other components that receive the messages 116 from the data sources 114. The APIs may share information included in the messages 116 using logs, caches, messaging queues, or other suitable formats.

At block 404, the process 400 involves converting the messages 116 from the data sources 114 into a standardized format. As described herein, the messages 116 generated by the data sources 14 can have different or non-standardized formats, which can complicate data analysis or data representation. To facilitate the generation of the interface 102, the messages 116 can be converted or transformed from the non-standardized formats into the standardized format. In some examples, the conversion of the messages 116 may be applied by a conversion module 202 that can be included as part of the database system 104 or as a separate component external to the database system 104. The conversion module 202 can analyze the messages 116 to determine whether one or more keywords are present in the messages 116. Subsequent to determining that a keyword is present in a particular message, the conversion module can apply a specific rule set to convert the particular message to the standardized format.

At block 406, the process 400 involves storing the converted messages 116 in the standardized format as a dataset in the database system 104. In some examples, the converted messages 116 can be stored as a single dataset in the database system 104. In other examples, information provided in the converted messages 116 may be stored in separate components or locations of the database system 104. As described herein, the messages 116 generated by the data sources 114 can include metadata 118 describing transfer operations, interaction events, etc. In an example, generating the database system 104 can involve storing the metadata 118 in a cache 120 of the database system 104 while storing remaining information of the messages 116 in a local database 122 of the database system 104. In another example, an entirety of the messages 116 may be stored in the local database 122.

At block 408, the process 400 involves providing access by one or more subscribers 126 to the database system 104 to collect at least a portion of the dataset. In some examples, the subscribers 126 can be part of a publish/subscribe (pub/sub) communication model in which the database system 104 can be a publisher or sender providing information (e.g., communication data) to the subscribers 126. Each subscriber can register or subscribe to one or more communication channels provided by the database system 104 to receive the information transmitted via the communication channels. After subscribing to a particular communication channel, the subscribers 126 can receive communication from the database system 104 when the database system 104 publishes information related to the particular communication channel. The communication can include the published information, a notification, or a combination thereof.

At block 410, the process 400 involves outputting, based on a request 124 from at least one of the subscribers 126, an interface 102 that includes at least the portion of the dataset to a user 110. In an example, the request 124 can include information to present to the user 110 via the interface 102. At least one subscriber can transmit the request 124 to a representation module 112 to generate one or more representations based on the request 124, such as based on the information included in the request 124. In some examples, the user 110 can provide user input 108 via the interface 102, such as by selecting certain interface elements of the interface 102 or by interacting (e.g., clicking, selecting, inputting, etc.) with the representations. Based on the user input 108, the representation module 112 can update or edit the representations, such as by generating an updated version of the interface 102 to replace an existing version of the interface 102 presented to the user 110.

In one example, the interface 102 can include one or more sections such that each section can provide a respective representation presenting information related to a specific content type. As an example, a particular representation in one section of the interface 102 can include information related to systems or networks (e.g., rails) used to facilitate movement of resources (e.g., computing or system resources) between entities involved in transfer operations. Examples of the systems or networks can include Automated Clearing House (ACH) operations, Real-Time Payments (RTP) networks, etc. As another example, one or more of the representations provided via the interface 102 can present a count or quantity of transfer operations associated with a specific content type. For instance, a particular representation presented in the interface 102 may include a count of transfer operations based on a type of the transfer operation (e.g., immediate, recurring, etc.). Additionally or alternatively, the count of the transfer operations can be classified or organized based on a status of the transfer operations, such as whether the transfer operations are pending, completed, incomplete, released, objected to, validated, etc. Furthermore, the count of the transfer operations can be presented based on an amount corresponding to the resources involved in the transfer operations. For example, a particular representation can organize the count of the transfer operations such that a specific transfer operation having a highest amount of transferred resources is arranged prior to the remaining transfer operations shown in the particular representation.

Figure 5:
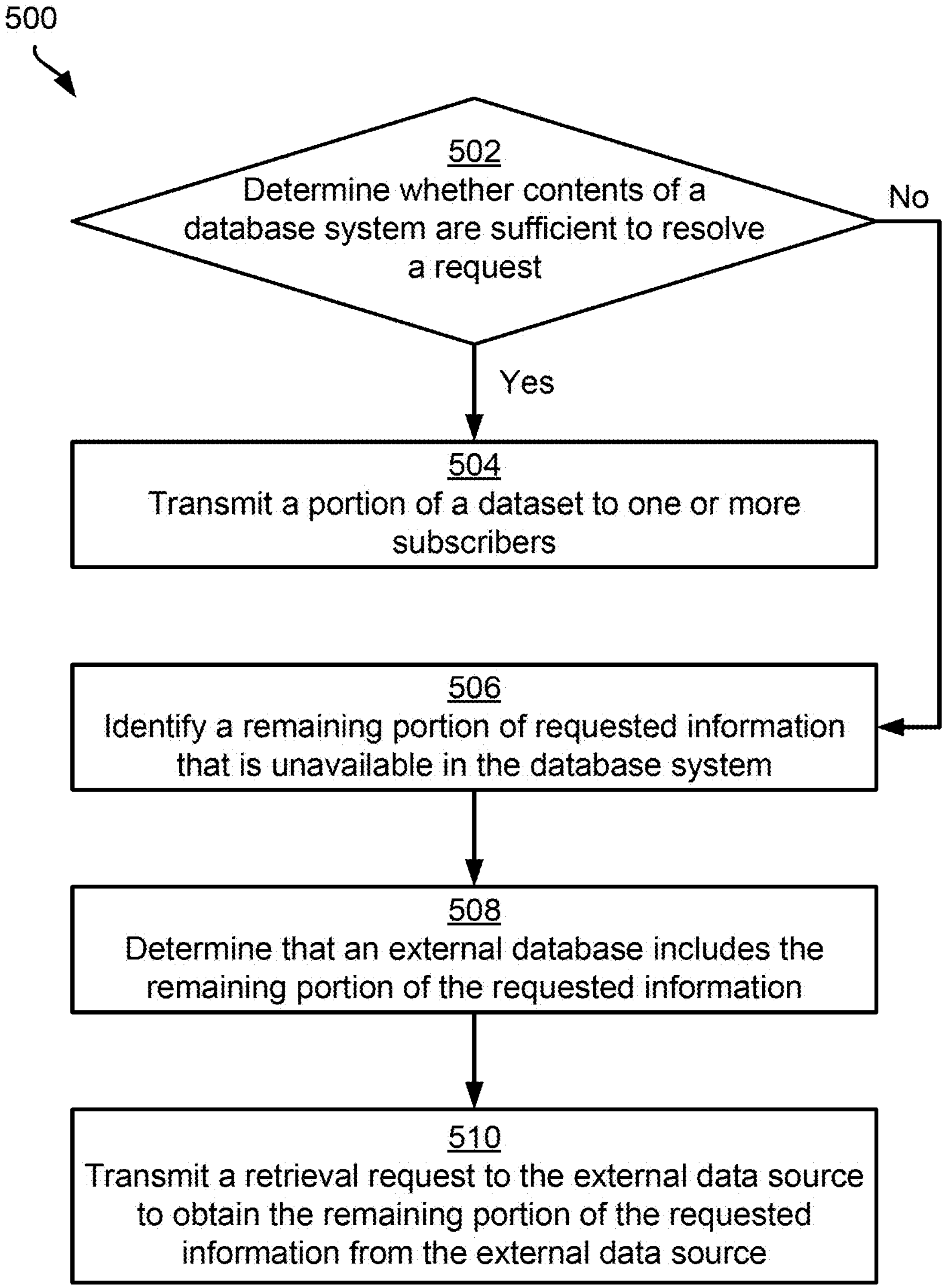
FIG. 5 is a flow chart of an example process to retrieve data from a database system generated using distributed data sources according to some aspects of the present disclosure.

FIG. 5 is a flow chart of an example process 500 to retrieve data from a database system 104 generated using distributed data sources according to some aspects of the present disclosure. Other examples can involve more operations, fewer operations, different operations, or a different order of operations shown in the figures. The operations of FIG. 5 will now be described below with reference to the components described above in FIG. 1 and FIG. 2. Some or all of the steps of the process 500 can be performed by the processing device 302.

At block 502, the process 500 involves determining, based on a request 124, whether contents of the database system 104 are sufficient to resolve the request 124. As described herein, at least one subscriber 126 can generate the request 124 to initiate a creation of an interface 102. Generating the interface 102 can involve retrieving suitable information from the database system 104 to output via the interface 102. In an example, the subscribers 126 may generate multiple requests 124. The contents of the database system 104 can include one or more messages 116, metadata 118 associated with the messages 116, or a combination thereof. If the contents of the database system 104 are determined to be sufficient to resolve the request 124, the process 500 can proceed to block 504. Conversely, if the contents of the database system 104 are determined to be insufficient to resolve the request 124, the process 500 can proceed to block 506.

At block 504, the process 500 involves, in response to determining that the contents of the database system 104 are sufficient to resolve the request 124, transmitting a portion of a dataset stored in the database system 104 to the subscribers 126. As described herein, if the subscribers 126 are part of a pub/sub system with the database system 104, the database system 104 can publish the portion of the dataset to the subscribers 126. Once the portion of the dataset is published, the subscribers 126 can access or retrieve the portion of the dataset and can request that a representation module 112 generate the interface 102 based on the portion of the dataset.

At block 506, the process 500 involves, in response to determining that the contents of the database system 104 are insufficient to resolve the request 124, identifying a remaining portion of requested information that is unavailable in the database system 104. The requested information can be part of or indicated in the request 124 that can be generated by at least one subscriber 126. In some examples, a portion of the requested information indicated in the request 124 can be accessible or available in the database system 104. The available portion of the requested information can be compared to the request 124 to determine the remaining portion of the requested information that is missing or otherwise unavailable in the database system 104.

At block 508, the process 500 involves determining that an external data source 128 (e.g., a database, application, service, etc.) includes the remaining portion of the requested information. As an example, one or more keywords can be identified as corresponding to the remaining portion of the requested information. The identified keywords then can be used in one or more queries or searches to identify the external data source 128. In some examples, the remaining portion of the requested information may be found in more than one external data source. For example, two keywords may be associated with the remaining portion of the requested information. A first database can store data related to a first keyword, while a different cache may include data related to a second keyword. Accordingly, retrieving the remaining portion of the requested information can involve communicating with more than one external data source.

At block 510, the process 500 involves transmitting a retrieval request 130 to the external data source 128 to obtain the remaining portion of the requested information from the external data source 128. In some examples, the retrieval request 130 can include an identifier (e.g., a keyword) corresponding to the remaining portion of the requested information. Using the identifier, the external data source 128 can generate a response including the remaining portion of the requested information. In some implementations, once the response is generated, the external data source 128 can transmit the response to the database system 104, for example enabling the database system 104 to publish the remaining portion of the requested information. In other implementations, the external data source 128 may be in communication with the subscribers 126 such that the external data source can directly transmit the response to a suitable subscriber that generated the request 124.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
- a processing device; and
- a memory device including instructions that are executable by the processing device for causing the processing device to perform operations comprising:
  - receiving one or more messages from a plurality of data sources, each data source of the plurality of data sources providing the messages in a non-standardized format;
  - converting the one or more messages from the plurality of data sources into a standardized format by modifying a respective structure of at least a portion of the one or more messages to transform unstructured data into structured data;
  - storing the converted one or more messages in the standardized format as a dataset in a database system;
  - providing access by one or more subscribers to the database system to collect at least a portion of the dataset;
  - outputting, based on a request from at least one subscriber of the one or more subscribers, an interface that comprises at least the portion of the dataset to a user;
  - determining, based on the request, whether contents of the database system are sufficient to resolve the request, the contents of the database system comprising the one or more messages and metadata associated with the one or more messages; and
  - in response to determining that the contents of the database system are insufficient to resolve the request, communicating with an external data source to resolve the request by:
    - identifying, based on requested information indicated in the request, a remaining portion of the requested information that is unavailable in the database system;
    - determining that the external data source comprises the remaining portion of the requested information; and
    - transmitting a retrieval request to the external data source to obtain the remaining portion of the requested information from the external data source such that the interface comprises the requested information.

2. The system of claim 1, wherein the database system comprises:
- a cache configured to store the metadata associated with the one or more messages from the plurality of data sources; and
- a local database configured to store the one or more messages in the standardized format.

3. The system of claim 2, wherein at least the portion of the dataset comprises:
- a subset of the metadata stored in the cache; and
- a subset of the one or more messages in the standardized format stored in the local database.

4. The system of claim 1, wherein converting the one or more messages from the plurality of data sources into the standardized format comprises:
- determining whether each message of the one or more messages comprises a keyword; and
- in response to determining that a particular message of the one or more messages comprises the keyword, applying a rule set associated with the keyword to convert the particular message into the standardized format.

5. The system of claim 1, wherein the operations further comprise:
- determining access permissions of the user based on login credentials related to the user, wherein the access permissions indicate a set of content types that the user is allowed to access; and
- providing, via the interface based on the access permissions of the user, the portion of the dataset, wherein the portion of the dataset comprises data corresponding to the set of content types that the user is allowed to access.

6. The system of claim 1, wherein the database system comprises a messaging queue having one or more communication channels to provide access by the one or more subscribers to the database system, and wherein each subscriber of the one or more subscribers is subscribed to a particular communication channel of the one or more communication channels.

7. A computer-implemented method comprising:

receiving, by a processing device, one or more messages from a plurality of data sources, each data source of the plurality of data sources providing the messages in a non-standardized format;

converting, by the processing device, the one or more messages from the plurality of data sources into a standardized format by modifying a respective structure of at least a portion of the one or more messages to transform unstructured data into structured data;

storing, by the processing device, the converted one or more messages in the standardized format as a dataset in a database system;

providing, by the processing device, access by one or more subscribers to the database system to collect at least a portion of the dataset;

outputting, by the processing device based on a request from at least one subscriber of the one or more subscribers, an interface that comprises at least the portion of the dataset to a user;

determining, based on the request, whether contents of the database system are sufficient to resolve the request, the contents of the database system comprising the one or more messages and metadata associated with the one or more messages; and in response to determining that the contents of the database system are insufficient to resolve the request, communicating with an external data source to resolve the request by:

identifying, based on requested information indicated in the request, a remaining portion of the requested information that is unavailable in the database system;

determining that the external data source comprises the remaining portion of the requested information; and transmitting a retrieval request to the external data source to obtain the remaining portion of the requested information from the external data source such that the interface comprises the requested information.

8. The computer-implemented method of claim 7, wherein the database system comprises:

a cache storing the metadata associated with the one or more messages from the plurality of data sources; and a local database storing the one or more messages in the standardized format.

9. The computer-implemented method of claim 8, wherein at least the portion of the dataset comprises:

a subset of the metadata stored in the cache; and a subset of the one or more messages in the standardized format stored in the local database.

10. The computer-implemented method of claim 7, wherein converting the one or more messages from the plurality of data sources into the standardized format comprises:

determining whether each message of the one or more messages comprises a keyword; and in response to determining that a particular message of the one or more messages comprises the keyword, applying a rule set associated with the keyword to convert the particular message into the standardized format.

11. The computer-implemented method of claim 7, further comprising:

determining access permissions of the user based on login credentials related to the user, wherein the access permissions indicate a set of content types that the user is allowed to access; and providing, via the interface based on the access permissions of the user, the portion of the dataset, wherein the portion of the dataset comprises data corresponding to the set of content types that the user is allowed to access.

12. A non-transitory computer-readable medium comprising program code executable by a processing device for causing the processing device to perform operations comprising:

receiving one or more messages from a plurality of data sources, each data source of the plurality of data sources providing the messages in a non-standardized format;

converting the one or more messages from the plurality of data sources into a standardized format by modifying a respective structure of at least a portion of the one or more messages to transform unstructured data into structured data;

storing the converted one or more messages in the standardized format as a dataset in a database system;

providing access by one or more subscribers to the database system to collect at least a portion of the dataset;

outputting, based on a request from at least one subscriber of the one or more subscribers, an interface that comprises at least the portion of the dataset to a user;

determining, based on the request, whether contents of the database system are sufficient to resolve the request, the contents of the database system comprising the one or more messages and metadata associated with the one or more messages; and in response to determining that the contents of the database system are insufficient to resolve the request, communicating with an external data source to resolve the request by:

identifying, based on requested information indicated in the request, a remaining portion of the requested information that is unavailable in the database system;

determining that the external data source comprises the remaining portion of the requested information; and transmitting a retrieval request to the external data source to obtain the remaining portion of the requested information from the external data source such that the interface comprises the requested information.

13. The non-transitory computer-readable medium of claim 12, wherein the database system comprises:

a cache storing the metadata associated with the one or more messages from the plurality of data sources; and a local database storing the one or more messages in the standardized format.

14. The non-transitory computer-readable medium of claim 13, wherein at least the portion of the dataset comprises:

a subset of the metadata stored in the cache; and a subset of the one or more messages in the standardized format stored in the local database.

* * * * *